US012367839B2

(12) United States Patent
Kim et al.

(10) Patent No.: US 12,367,839 B2
(45) Date of Patent: Jul. 22, 2025

(54) DISPLAY DEVICE AND DISPLAY DRIVING METHOD

(71) Applicant: LG Display Co., Ltd., Seoul (KR)

(72) Inventors: Kyung-Rok Kim, Gyeonggi-do (KR); Hyuckjun Kim, Gyeonggi-do (KR); Min Kim, Seoul (KR)

(73) Assignee: LG DISPLAY CO., LTD., Seoul (KR)

( * ) Notice: Subject to any disclaimer, the term of this patent is extended or adjusted under 35 U.S.C. 154(b) by 26 days.

(21) Appl. No.: 18/390,307

(22) Filed: Dec. 20, 2023

(65) Prior Publication Data

US 2024/0221685 A1 Jul. 4, 2024

(30) Foreign Application Priority Data

Dec. 29, 2022 (KR) ........................ 10-2022-0188775

(51) Int. Cl.
*G09G 3/3275* (2016.01)

(52) U.S. Cl.
CPC ... *G09G 3/3275* (2013.01); *G09G 2300/0842* (2013.01); *G09G 2300/0861* (2013.01); *G09G 2310/0294* (2013.01); *G09G 2310/08* (2013.01)

(58) Field of Classification Search
CPC .................................................... G09G 3/3275
USPC .......................................................... 345/176
See application file for complete search history.

(56) References Cited

U.S. PATENT DOCUMENTS

| | | | | |
|---|---|---|---|---|
| 2011/0157152 A1* | 6/2011 | Byun | G09G 3/3233 | 345/76 |
| 2017/0193922 A1* | 7/2017 | Pyeon | G09G 3/3291 | |
| 2024/0153453 A1* | 5/2024 | Kim | G09G 3/32 | |

* cited by examiner

*Primary Examiner* — Calvin C Ma
(74) *Attorney, Agent, or Firm* — Morgan, Lewis & Bockius LLP

(57) ABSTRACT

A display device may include a plurality of subpixels respectively connected to a plurality of data lines; a data driving circuit configured to convert a compensated digital image data into an analog data voltage and to supply the analog data voltage to the data lines; a large-capacity memory configured to store initial compensation data based on a characteristic value for each of the plurality of subpixels; a high-speed memory configured to store sampled compensation data sampled from the initial compensation data for less than all of the plurality of subpixels in one frame; and a timing controller configured to control the gate driving circuit and the data driving circuit, to determine final compensation data based on at least one of the sampled compensation data and the initial compensation data, and to output the compensated digital image data based on an input image data and the final compensation data.

20 Claims, 14 Drawing Sheets

DISPLAY DEVICE AND DISPLAY DRIVING METHOD

CROSS-REFERENCE TO RELATED APPLICATION

This application claims priority from Korean Patent Application No. 10-2022-0188775, filed on Dec. 29, 2022, which is hereby incorporated by reference for all purposes as if fully set forth herein.

BACKGROUND

Technical Field

Embodiments of the present disclosure relate to a display device and a display driving method and, more particularly, to a display device and a display driving method capable of reducing a size and power consumption of a memory.

Description of Related Art

With the development of the information society, various needs for display devices that display images are increasing. Various types of display devices, such as liquid crystal displays (LCDs), organic light emitting displays (OLEDs), among others, are being utilized.

Among these display devices, the organic light emitting display devices use self-emissive organic light emitting diodes as light emitting elements, thus providing such advantages as a fast response and better contrast ratio, luminous efficiency, luminance, and viewing angle.

The organic light emitting diode displays include organic light emitting diodes in subpixels arranged on a display panel and allow the organic light emitting diodes to emit light by controlling the current flowing to the organic light emitting diodes, thereby controlling the brightness represented by each subpixel while displaying an image.

The subpixels are driven by scan signals applied through gate lines, and gray levels are represented according to the data voltages applied through data lines when the scan signals are applied, thereby displaying an image.

A subpixel of the display device includes a driving transistor that controls current flowing through a light emitting element. The driving transistor may be implemented as a thin film transistor (TFT). In this case, it is preferable that electrical characteristics of the driving transistor, such as threshold voltage and mobility, are designed to be the same in all subpixels. However, electrical characteristics of the subpixels may not be uniform due to, among other things, process conditions and driving environments.

Methods for compensating for changes in characteristic values of subpixels may be generally divided into internal compensation methods and external compensation methods. The internal compensation method automatically compensates for the threshold voltage deviation between driving transistors inside the subpixel circuit. For this internal compensation, since the current flowing through the light emitting element should be determined regardless of the threshold voltage of the driving transistor, the configuration of the subpixel circuit may become more complicated.

The external compensation method senses electric characteristics between driving transistors and, based on the sensing result, modulates the data voltage by a compensation circuit outside the display panel to compensate for a change in characteristic value of each subpixel. In this case, for external compensation, compensation data for compensating for a change in the characteristic value of each subpixel is stored in a memory.

Meanwhile, as display performance enhances, a demand for large-area, high-resolution display devices gradually increases. Accordingly, as the area or resolution of the display device increases, the size of the memory for storing compensation data for compensating for a change in the characteristic value of the subpixel may increase, and power consumption may increase accordingly.

SUMMARY

Accordingly, embodiments of the present disclosure are directed to a display device and a driving method thereof that substantially obviate one or more problems due to the limitations and disadvantages of the related art. For example, the inventors of the present disclosure have invented a low-power display device and display driving method capable of reducing power consumption and the size of the memory for storing compensation data for compensating for the characteristic values of the subpixel.

Embodiments of the present disclosure may provide a low-power display device and display driving method capable of reducing power consumption and size of the memory for high-rate processing by sampling and processing the entire compensation data for the characteristic values of the subpixel at regular intervals.

Embodiments of the present disclosure may also provide a low-power display device and display driving method capable of enhancing compensation performance for the characteristic values of the subpixel by applying sampled compensation data on a per-frame basis and using predicted compensation data in the interval between the sampled compensation data.

The features and aspects of the present disclosure are not limited to those mentioned above. Additional features and aspects will be set forth in part in the description that follows and in part will become apparent to those skilled in the art from the description or may be learned by practice of the inventive concepts provided herein. Other features and aspects of the inventive concepts may be realized and attained by the structure particularly pointed out in, or derivable from, the written description, the claims hereof, and the appended drawings.

To achieve these and other advantages and in accordance with the purpose of the disclosure, as embodied and broadly described herein, a display device may include: a display panel including a plurality of gate lines, a plurality of data lines, and a plurality of subpixels respectively connected to the plurality of gate lines and the plurality of data lines; a gate driving circuit configured to supply a scan signal to the plurality of gate lines; a data driving circuit configured to convert a compensated digital image data into an analog data voltage and to supply the analog data voltage to the plurality of data lines; a large-capacity memory configured to store initial compensation data based on a characteristic value for each of the plurality of subpixels; a high-speed memory configured to store sampled compensation data sampled from the initial compensation data for less than all of the plurality of subpixels in one frame; and a timing controller configured to control the gate driving circuit and the data driving circuit, to determine final compensation data based on at least one of the sampled compensation data and the initial compensation data, and to output the compensated digital image data based on an input image data and the final compensation data.

In another aspect of the present disclosure, a method of driving a display device having a plurality of subpixels may include: storing initial compensation data for each of the plurality of subpixels in a large-capacity memory; sampling the initial compensation data for less than all of the plurality of subpixels in one frame; storing the sampled compensation data for less than all of the plurality of subpixels in a high-speed memory in the one frame; determining final compensation data for the plurality of subpixels based on at least one of the initial compensation data and the sampled compensation data; and compensating for a change in a characteristic value of the plurality of subpixels based on the final compensation data.

In yet another aspect of the present disclosure, a display device may include: a display panel including a plurality of data lines and a plurality of subpixels respectively connected to the plurality of data lines; a data driving circuit configured to apply a data voltage to the plurality of data lines based on a compensated image data; a large-capacity memory configured to store initial compensation data based on a characteristic value for each of the plurality of subpixels; a high-speed memory configured to store sampled compensation data; and a timing controller configured to control the data driving circuit, to determine the final compensation data based on at least one of the sampled compensation data and the initial compensation data, and to output the compensated image data based on an input image data and the final compensation data. The timing controller may be further configured to: sample the initial compensation data for an (n+1)-th subpixel among the plurality of subpixels and store the sampled compensation data for the (n+1)-th subpixel in the high-speed memory in an (n+1)-th frame; and sample the initial compensation data for an (n+2)-th subpixel among the plurality of subpixels and store the sampled compensation data for the (n+2)-th subpixel in the high-speed memory in an (n+2)-th frame, wherein n may be an integer greater than or equal to 0.

According to embodiments of the present disclosure, there may be provided a low-power display device and display driving method capable of reducing power consumption and the size of the memory for storing compensation data for compensating for the characteristic values of the subpixel.

According to embodiments of the present disclosure, there may be provided a low-power display device and display driving method capable of reducing power consumption and size of the memory for high-rate processing by sampling and processing the entire compensation data for the characteristic values of the subpixel at regular intervals.

According to embodiments of the present disclosure, there may be provided a low-power display device and display driving method capable of enhancing compensation performance for the characteristic values of the subpixel by applying sampled compensation data on a per-frame basis and using predicted compensation data in the interval between the sampled compensation data.

It is to be understood that both the foregoing general description and the following detailed description of the present disclosure are by way of example and are intended to provide further explanation of the disclosures as claimed.

BRIEF DESCRIPTION OF DRAWINGS

The accompanying drawings, which are included to provide a further understanding of the disclosure and are incorporated in and constitute a part of this specification, illustrate embodiments of the disclosure and together with the description serve to explain the principles of the disclosure. In the drawings.

DETAILED DESCRIPTION

Figure 1:
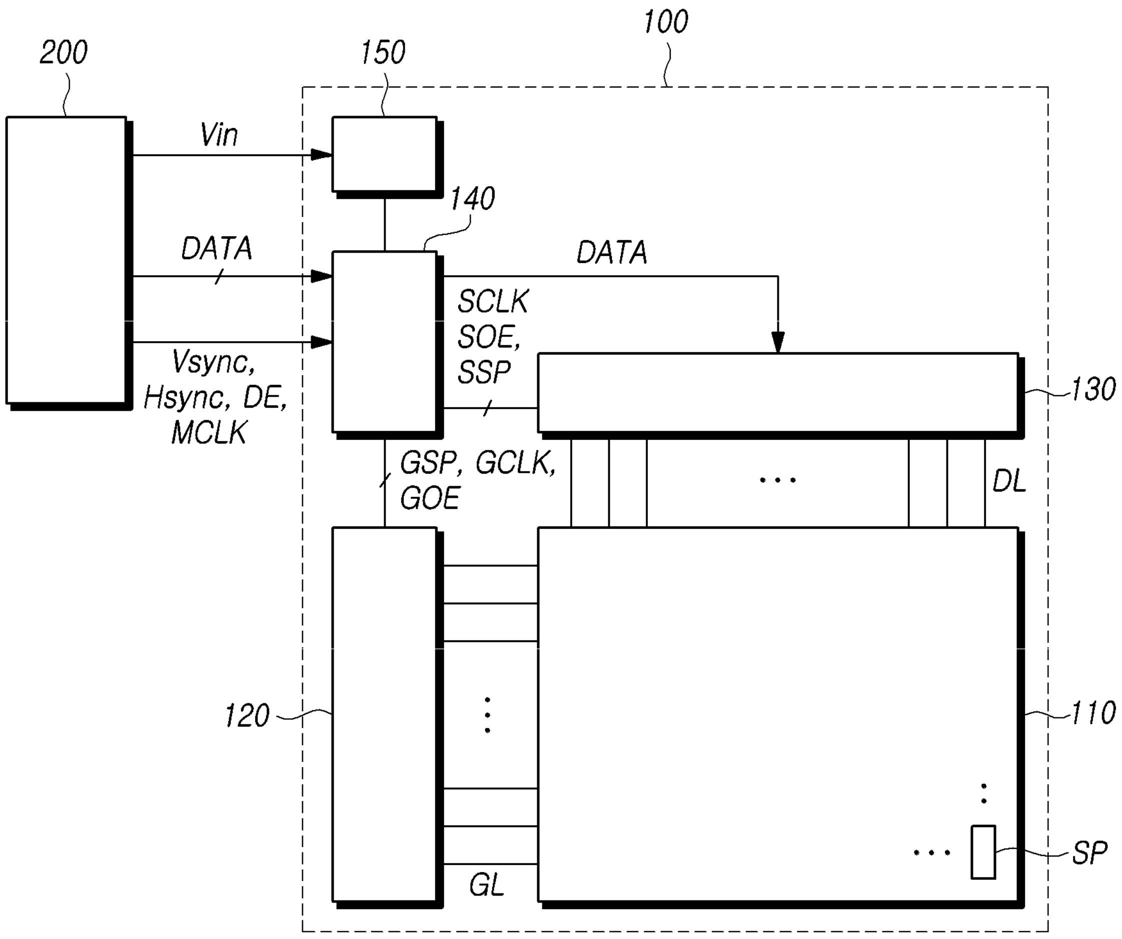
FIG. 1 is a view schematically illustrating a configuration of a display device according to various example embodiments of the present disclosure.

In the following description of example embodiments of the present disclosure, reference will be made to the accompanying drawings, which illustrate specific example embodiments that can be implemented. However, such illustration is by way of example, and the present disclosure is not limited to such specific example embodiments. The same reference numerals and signs refer to the same or like components, unless otherwise described, even when they are shown in different accompanying drawings from one another.

Further, in the following description, where a detailed description of a relevant known function or configuration may unnecessarily obscure an important point of the present disclosure, a detailed description of such known function of configuration may be omitted.

Where the terms "comprise," "have," "include," "formed of," and the like are used, one or more other elements may be added unless a more limiting term, such as "only," is used. An element described in the singular form is intended to include a plurality of elements, and vice versa, unless the context clearly indicates otherwise.

Although such terms as "first," "second," A, B, (a), (b), and the like may be used herein to describe various elements, these elements should not be interpreted to be limited by these terms as they are not used to define, for example, an essence, order, sequence, or number of elements. These terms are used only to distinguish one element from another. For example, a first element could be termed a second element, and, similarly, a second element could be termed a first element, without departing from the scope of the present disclosure.

Where an expression that an element or layer "is connected to," "is coupled to," "is adhered to," "contacts," or "overlaps" another element or layer is used, the element or layer can not only be directly connected, coupled, or adhered to or directly contact or overlap another element or layer, but also be indirectly connected, coupled, or adhered or indirectly contact or overlap another element or layer with one or more intervening elements or layers "disposed," or "interposed" between the elements or layers, unless otherwise specified.

Where a temporal relationship between processes, methods, operations, flows, steps, events, or the like is described as, for example, "after," "subsequent to," "next," or "before," and the like, the relationship encompasses not only a continuous or sequential order but also a non-continuous or non-sequential relationship unless a more limiting term, such as "immediate(ly)," or "direct(ly)," is also used.

The shapes, sizes, ratios, angles, numbers, and the like, which are illustrated in the drawings to describe various example embodiments of the present disclosure, are merely given by way of example. Therefore, the present disclosure is not limited to the illustrations in the drawings.

In addition, in construing an element, the element (including its dimensions and relative size) is to be construed as including an ordinary error or tolerance range even where no explicit description of such an error or tolerance range is provided. A tolerance or error range may be caused by various factors, such as process factors, internal or external impact, noise, and the like. Further, the term "may" fully encompasses all the meanings of the term "can."

Reference will now be made in detail to embodiments of the present disclosure, examples of which may be illustrated in the accompanying drawings.

FIG. 1 is a view schematically illustrating a configuration of a display device according to various example embodiments of the present disclosure.

As shown in FIG. 1, a display device 100 according to example embodiments of the present disclosure may include a display panel 110 where a plurality of gate lines GL and data lines DL are connected, and a plurality of subpixels SP are arranged in a matrix form. The display device 100 may also include a gate driving circuit 120 for driving the plurality of gate lines GL, a data driving circuit 130 for supplying a data voltage through the plurality of data lines DL, a timing controller 140 for controlling the gate driving circuit 120 and the data driving circuit 130, and a power management circuit 150.

The display panel 110 may display an image based on a scan signal transferred from the gate driving circuit 120 through the plurality of gate line GLs GL and the data voltage transferred from the data driving circuit 130 through the plurality of data lines DL.

In the case of a liquid crystal display, the display panel 110 may include a liquid crystal layer formed between two substrates and may be operated in any known mode, such as a twisted nematic (TN) mode, a vertical alignment (VA) mode, an in-plane switching (IPS) mode, or a fringe field switching (FFS) mode. In the case of an organic light emitting display, the display panel 110 may be implemented in a top emission scheme, a bottom emission scheme, or a dual-emission scheme.

In the display panel 110, a plurality of pixels may be arranged in a matrix form, and each pixel may include subpixels SP having different colors, e.g., a white subpixel, a red subpixel, a green subpixel, and a blue subpixel. Each subpixel SP may be defined by the plurality of data lines DL and the plurality of gate lines GL.

One subpixel SP may include, e.g., a thin film transistor (TFT) formed at the intersection between a corresponding data line DL and a corresponding gate line GL, a light emitting element, such as an organic light emitting diode, charged with the data voltage, and a storage capacitor electrically connected to the light emitting element to maintain the data voltage.

For example, if the display device 100 having a resolution of 2,160×3,840 includes three subpixels SP of red (R), green (G), and blue (B), 3,840 data lines DL may be connected to 2,160 gate lines GL and three subpixels RGB. Thus, in this example configuration, there may be provided 3,840×3=11,520 data lines DL. Each subpixel SP may be disposed at the intersection between the corresponding gate line GL and the corresponding data line DL.

The gate driving circuit 120 may be controlled by the timing controller 140 to sequentially output scan signals to the plurality of gate lines GL disposed in the display panel 110 to control the driving timing of the plurality of subpixels SP.

In the example display device 100 having a resolution of 2,160×3,840, sequentially outputting the scan signal to the 2,160 gate lines GL from the first gate line to the 2,160-th gate line may be referred to as a 2,160-phase driving operation. Sequentially outputting the scan signal to each unit of four gate lines GL, e.g., sequentially outputting the scan signal to the fifth gate line to the eighth gate line after sequentially outputting the scan signal to the first gate line to the fourth gate line, may be referred to as 4-phase driving. In other words, sequentially outputting the scan signal to every N-th gate lines GL may be referred to as an N-phase driving operation.

The gate driving circuit 120 may include one or more gate driving integrated circuits GDIC. Depending on driving schemes employed, the gate driving circuit 120 may be positioned on only one side, or each of two opposite sides, of the display panel 110. The gate driving circuit 120 may be implemented in a gate-in-panel (GIP) form and be embedded in the bezel area of the display panel 110.

The data driving circuit 130 may receive image data DATA from the timing controller 140 and may convert the received image data DATA into an analog data voltage. Then, as the data voltage is output to each data line DL when the scan signal is applied through the corresponding gate line GL, each subpixel SP connected to the data line DL may display a light emitting signal having the brightness corresponding to the data voltage.

Likewise, the data driving circuit 130 may include one or more source driving integrated circuits SDIC. The source driving integrated circuit SDIC may be connected to the bonding pad of the display panel 110 in a tape automated bonding (TAB) type or a chip-on-glass (COG) type or may be disposed directly on the display panel 110.

In some cases, each source driving integrated circuit SDIC may be integrated and disposed on the display panel 110. Further, each source driving integrated circuit SDIC may be implemented in a chip-on-film (COF) type where each source driving integrated circuit SDIC may be mounted on a circuit film and may be electrically connected to the data line DL of the display panel 110 through the circuit film.

The timing controller 140 may supply various control signals to the gate driving circuit 120 and the data driving circuit 130 and may control the operation of the gate driving circuit 120 and the data driving circuit 130. In other words, the timing controller 140 may control the gate driving circuit 120 to output a scan signal according to the timing implemented in each frame and may transfer the image data DATA received from an external source to the data driving circuit 130.

In this case, the timing controller 140 may receive, from an external host system 200, various timing signals including, e.g., a vertical synchronization signal Vsync, a horizontal synchronization signal Hsync, a data enable signal DE, and a main clock MCLK, together with the image data DATA.

The host system 200 may be any one of a television (TV) system, a set-top box, a navigation system, a personal computer (PC), a home theater system, a mobile device, and a wearable device, but is not limited thereto.

Accordingly, the timing controller 140 may generate a control signal according to various timing signals received from the host system 200 and may transfer the control signals to the gate driving circuit 120 and the data driving circuit 130.

For example, the timing controller 140 may output various gate control signals including, e.g., a gate start pulse GSP, a gate clock GCLK, and a gate output enable signal GOE, to control the gate driving circuit 120. The gate start pulse GSP may control the timing at which one or more gate driving integrated circuits GDIC constituting the gate driving circuit 120 start operation. The gate clock GCLK may be a clock signal commonly input to one or more gate driving integrated circuits GDIC to control the shift timing of the scan signal. The gate output enable signal GOE may designate timing information about one or more gate driving integrated circuits GDICs.

The timing controller 140 may also output various data control signals including, e.g., a source start pulse SSP, a source clock SCLK, and a source output enable signal SOE, to control the data driving circuit 130. The source start pulse SSP may control the timing at which one or more source driving integrated circuits SDIC constituting the data driving circuit 130 start data sampling. The source clock SCLK may be a clock signal that controls the timing of sampling data in the source driving integrated circuit SDIC. The source output enable signal SOE may control the output timing of the data driving circuit 130.

The display device 100 may further include a power management circuit 150 that is configured to supply various voltages or currents to, e.g., the display panel 110, the gate driving circuit 120, and the data driving circuit 130 or is configured to control various voltages or currents to be supplied.

The power management circuit 150 may adjust the direct current (DC) input voltage Vin supplied from the host system 200, to provide power required to drive the display panel 110, the gate driving circuit 120, and the data driving circuit 130.

Each subpixel SP may be positioned at the intersection between a corresponding gate line GL and a corresponding data line DL. A light emitting element may be disposed in each subpixel SP. For example, the organic light emitting diode display may include a light emitting element, such as an organic light emitting diode, in each subpixel SP and may display an image by controlling the current flowing to the light emitting element according to the corresponding data voltage.

The display device 100 may be one of various types of devices, such as liquid crystal displays, organic light emitting diode displays, or plasma display panels, but is not limited thereto.

Figure 2:
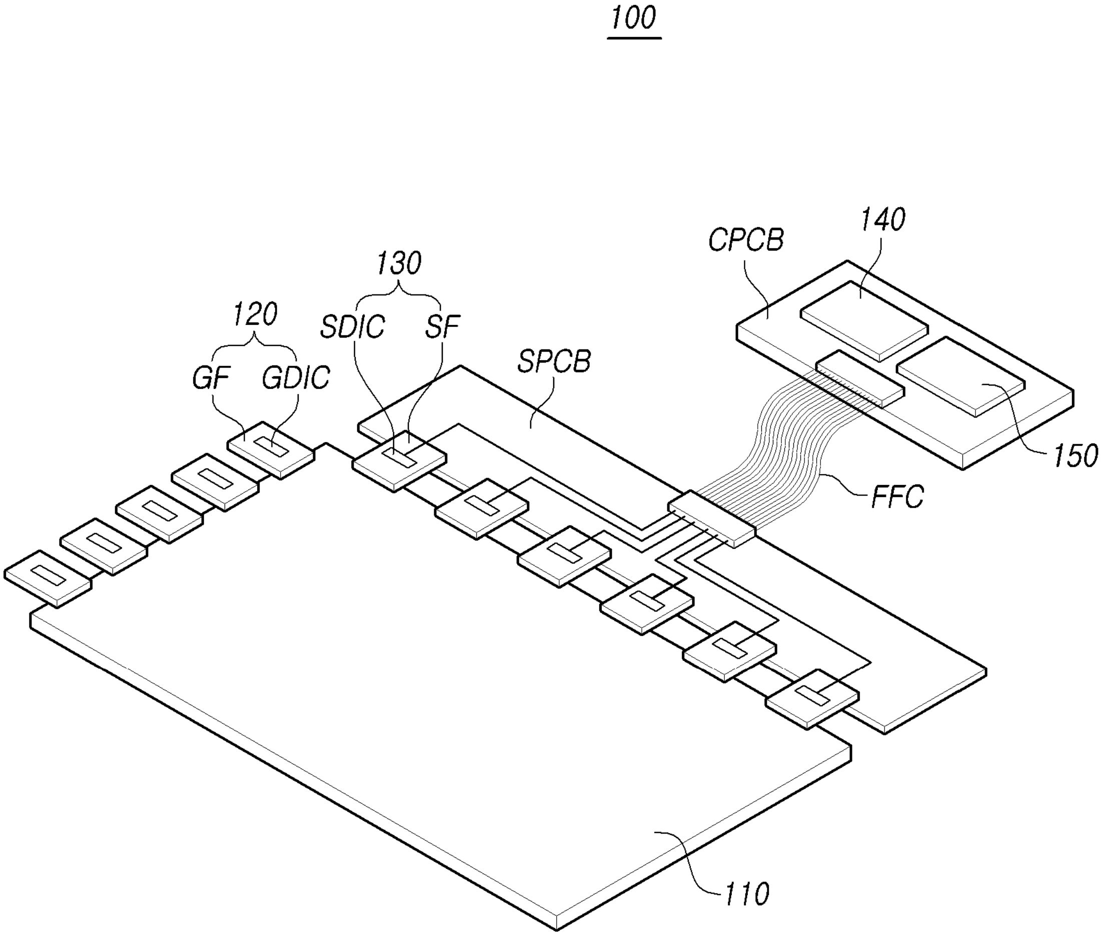
FIG. 2 is a view illustrating an example of a system of a display device according to example embodiments of the present disclosure.

FIG. 2 is a view illustrating an example of a system of a display device according to example embodiments of the present disclosure.

As illustrated in FIG. 2, in the display device 100 according to example embodiments of the present disclosure, the source driving integrated circuit SDIC included in the data driving circuit 130 and the gate driving integrated circuit GDIC included in the gate driving circuit 120 may be implemented as the chip-on-film (COF) type among various types (e.g., TAB, COG, or COF).

One or more gate driving integrated circuits GDIC included in the gate driving circuit 120 each may be mounted on a gate film GF, and one side of the gate film GF may be electrically connected with the display panel 110. Lines for electrically connecting the gate driving integrated circuit GDIC and the display panel 110 may be disposed on the gate film GF.

Likewise, one or more source driving integrated circuits SDIC included in the data driving circuit 130 each may be mounted on the source film SF, and one side of the source film SF may be electrically connected with the display panel 110. Lines for electrically connecting the source driving integrated circuit SDIC and the display panel 110 may be disposed on the source film SF.

The display device 100 may include at least one source printed circuit board SPCB for circuit connection between one or more source driving integrated circuits SDIC and other devices. The display device 100 may also include a control printed circuit board CPCB for mounting control components and various electric devices.

The other side of a source film SF where a source driving integrated circuit SDIC is mounted may be connected to at least one source printed circuit board SPCB. In other words, one side of the source film SF on which the source driving integrated circuit SDIC is mounted may be electrically connected with the display panel 110, and the other side of the source film SF may be electrically connected with the source printed circuit board SPCB.

The timing controller 140 and the power management circuit 150 may be mounted on the control printed circuit board CPCB. The timing controller 140 may control the operation of the data driving circuit 130 and the gate driving circuit 120. The power management circuit 150 may supply driving voltage or current to the display panel 110, the data driving circuit 130, and the gate driving circuit 120 and may control the supplied voltage or current.

At least one source printed circuit board SPCB and control printed circuit board CPCB may be circuit-connected through at least one connection member. The connection member may include, e.g., a flexible printed circuit FPC or a flexible flat cable FFC. In this case, the connection member connecting the at least one source printed circuit board SPCB and control printed circuit board CPCB may be varied depending on the size and type of the display device 100. In some example configurations, the at least one source printed circuit board SPCB and control printed circuit board CPCB may be integrated into a single printed circuit board.

In the so-configured display device 100, e.g., as illustrated in FIG. 2, the power management circuit 150 may transfer a driving voltage for display driving or characteristic value sensing to the source printed circuit board SPCB through the flexible printed circuit FPC or flexible flat cable FFC. The driving voltage transferred to the source printed circuit board SPCB may be supplied to a specific subpixel SP in the display panel 110 through the source driving integrated circuit SDIC to cause the subpixel SP to emit light or to sense a characteristic value of the subpixel SP.

Each of the subpixels SP arranged in the display panel 110 in the display device 100 may include an organic light emitting diode, which is a light emitting element, and a circuit element, e.g., a driving transistor, for driving the organic light emitting diode.

The type and number of circuit elements constituting each subpixel SP may be varied depending on functions to be provided and design schemes.

Figure 3:
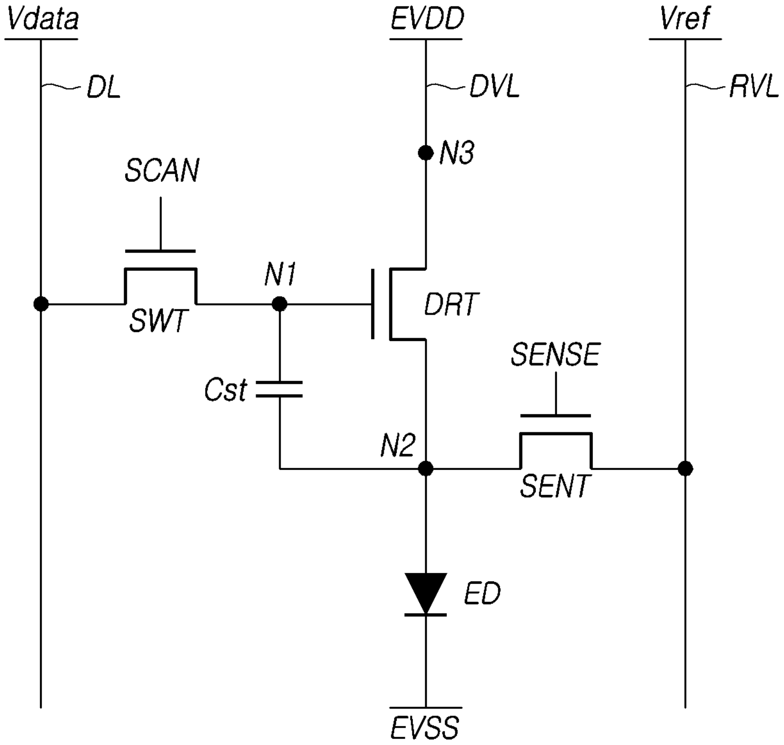
FIG. 3 is a view illustrating an example of a circuit constituting a subpixel in a display device according to example embodiments of the present disclosure.

FIG. 3 is a view illustrating an example of a circuit constituting a subpixel SP in a display device according to example embodiments of the present disclosure.

As illustrated in FIG. 3, in the display device 100 according to example embodiments of the present disclosure, the subpixel SP may include one or more transistors, a capacitor, and an organic light emitting diode (OLED) as a light emitting element ED.

For example, the subpixel SP may include a driving transistor DRT, a switching transistor SWT, a sensing transistor SENT, a storage capacitor Cst, and a light emitting element ED.

The driving transistor DRT may include the first node N1, second node N2, and third node N3. The first node N1 of the driving transistor DRT may be a gate node to which the data voltage Vdata is applied from the data driving circuit 130 through the data line DL when the switching transistor SWT is turned on. The second node N2 of the driving transistor DRT may be electrically connected with the anode electrode of the light emitting element ED and may be one of the source node and drain node. The third node N3 of the driving transistor DRT may be electrically connected with the driving voltage line DVL to which the driving voltage EVDD is applied and may be the other of the drain node and the source node.

In this case, during a display driving period, a driving voltage EVDD for displaying an image may be supplied to the driving voltage line DVL. For example, the driving voltage EVDD for displaying an image may be 27V, but the present disclosure is not limited thereto.

The switching transistor SWT may be electrically connected between the first node N1 of the driving transistor DRT and the data line DL, and may have a gate node connected to the gate line GL. Thus, the switching transistor SWT may be operated according to the scan signal SCAN supplied through the gate line GL. When turned on, the switching transistor SWT may transfer the data voltage Vdata supplied through the data line DL to the gate node of the driving transistor DRT, thereby controlling the operation of the driving transistor DRT.

The sensing transistor SENT may be electrically connected between the second node N2 of the driving transistor DRT and the reference voltage line RVL, and may have a gate node connected to the gate line GL. The sensing transistor SENT may be operated according to the sense signal SENSE supplied through the gate line GL. When the sensing transistor SENT is turned on, a sensing reference voltage Vref supplied through the reference voltage line RVL may be transferred to the second node N2 of the driving transistor DRT.

In other words, as the switching transistor SWT and the sensing transistor SENT are controlled, the voltage of the first node N1 and the voltage of the second node N2 of the driving transistor DRT may be controlled, so that the current for driving the light emitting element ED may be supplied.

The gate nodes of the switching transistor SWT and the sensing transistor SENT may be commonly connected to one gate line GL or may be connected to different gate lines GL. An example is shown in FIG. 3 in which the respective gate nodes of the switching transistor SWT and the sensing transistor SENT are connected to different gate lines GL. In such an example configuration, the switching transistor SWT and the sensing transistor SENT may be independently controlled by the scan signal SCAN and the sense signal SENSE transferred through different gate lines GL.

In contrast, if the switching transistor SWT and the sensing transistor SENT are connected to one gate line GL, the switching transistor SWT and the sensing transistor SENT may be simultaneously controlled by the scan signal SCAN or sense signal SENSE transferred through one gate line GL, and the aperture ratio of the subpixel SP may be increased.

The transistors disposed in the subpixel SP may be an n-type transistor or a p-type transistor. In the example shown in FIG. 3, the transistors are n-type transistors.

The storage capacitor Cst may be electrically connected between the first node N1 and second node N2 of the driving transistor DRT and may maintain the data voltage Vdata during one frame.

The storage capacitor Cst may also be connected between the first node N1 and third node N3 of the driving transistor DRT depending on the type of the driving transistor DRT. The anode electrode of the light emitting element ED may be electrically connected with the second node N2 of the driving transistor DRT, and a base voltage EVSS may be applied to the cathode electrode of the light emitting element ED.

The base voltage EVSS may be a ground voltage or a voltage higher or lower than the ground voltage. The base voltage EVSS may vary depending on the driving state. For example, the base voltage EVSS at the time of display driving and the base voltage EVSS at the time of sensing driving may be set to differ from each other.

The structure of the subpixel SP described above as an example is a 3T (transistor) 1C (capacitor) structure, which is merely an example used for illustrative purposes. However, the structure of the subpixel SP is not limited to this particular example. For example, the subpixel SP may further include one or more transistors or, in some cases, one or more capacitors. The plurality of subpixels SP may have the same structure, or some of the plurality of subpixels SP may have a different structure.

Figure 4:
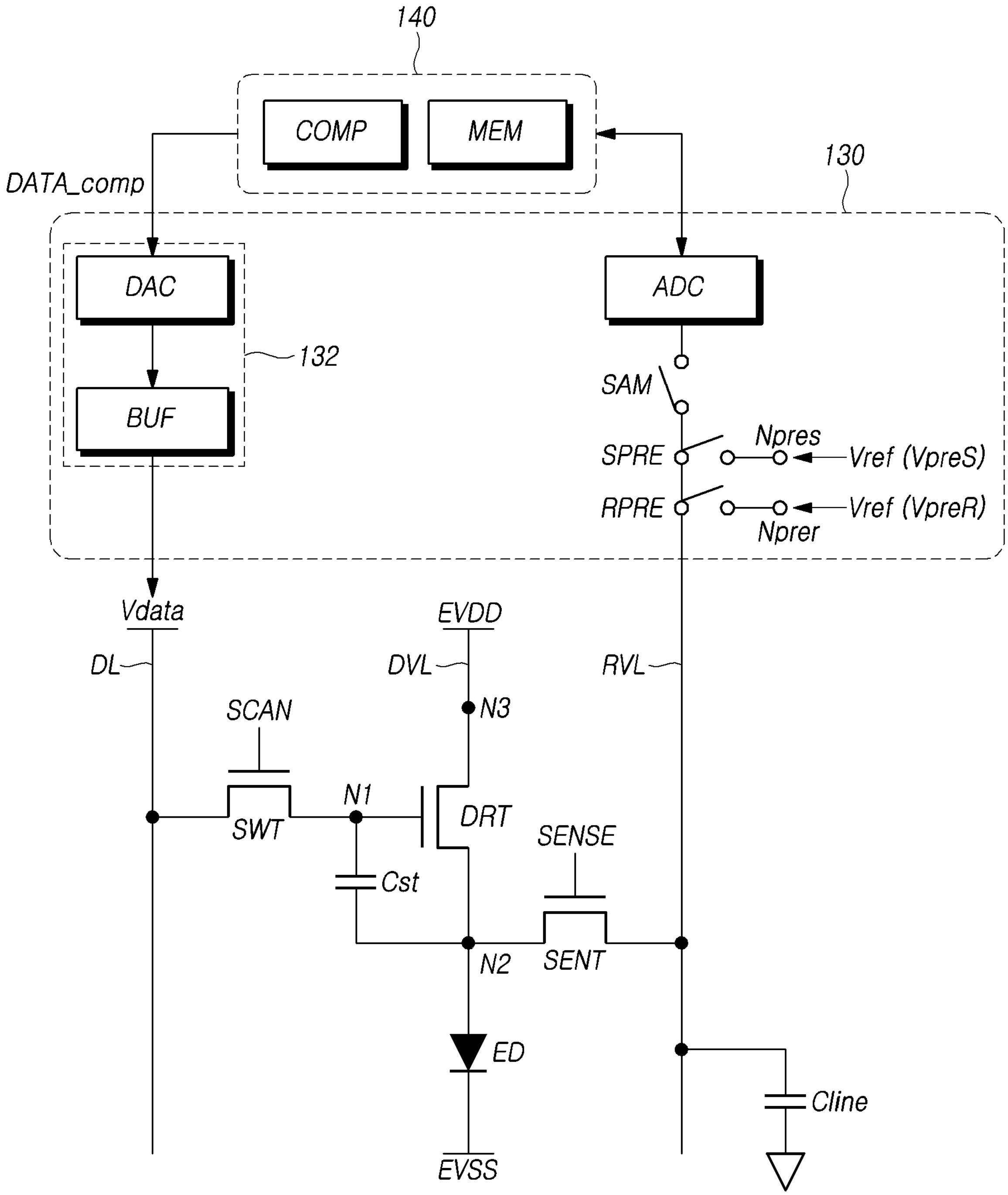
FIG. 4 is a view illustrating an example of a compensation circuit of a display device according to example embodiments of the present disclosure.

FIG. 4 is a view illustrating an example of a compensation circuit of a display device according to example embodiments of the present disclosure.

As illustrated in FIG. 4, a display device 100 according to example embodiments of the present disclosure may sense a change in a characteristic value of each driving transistor DRT to compensate for the characteristic value deviation of the driving transistor DRT. To that end, the compensation circuit of the display device 100 according to example embodiments of the present disclosure may include components for sensing a change in the characteristic value of the driving transistor DRT in the subpixel SP in the sensing period for the subpixel SP having a 3T1C structure as in the example illustrated in FIG. 4 or any of other possible structures for the subpixel SP.

The display device 100 according to example embodiments of the present disclosure may sense the voltage of the reference voltage line RVL in the sensing period and may determine the characteristic value or a change in the characteristic value of the driving transistor DRT in the subpixel SP from the sensed voltage.

Specifically, in the display device 100 according to example embodiments of the present disclosure, a characteristic value or the change in the characteristic value of the driving transistor DRT may be reflected as the voltage at the second node N2 of the driving transistor DRT (e.g., Vdata−Vth). The voltage at the second node N2 of the driving transistor DRT may correspond to the voltage of the reference voltage line RVL when the sensing transistor SENT is in the turned-on state. The line capacitor Cline on the reference voltage line RVL may be charged by the voltage at the second node N2 of the driving transistor DRT. The reference voltage line RVL may have a voltage corresponding to the voltage at the second node N2 of the driving transistor DRT due to the charged line capacitor Cline.

The compensation circuit of the display device 100 according to example embodiments of the present disclosure may control the on/off operation of the switching transistor SWT and the sensing transistor SENT in the subpixel SP to control the supply of the data voltage Vdata and the reference voltage Vref, respectively, to allow the second node N2 of the driving transistor DRT to be in the state of reflecting the characteristic value (a threshold voltage or mobility) of the driving transistor DRT that may be sensed for determination of a change in the characteristic value.

The compensation circuit of the display device 100 according to example embodiments of the present disclosure may include an analog-to-digital converter ADC that measures the voltage of the reference voltage line RVL corresponding to the voltage at the second node N2 of the driving transistor DRT and converts the voltage into a digital value. The display device may further include a switch circuit SAM and SPRE for controlling the sensing driving and a switch circuit RPRE for sensing the characteristic value.

The switch circuit SAM and SPRE for controlling the sensing driving may include a sensing reference switch SPRE for controlling the connection between each reference voltage line RVL and the sensing reference voltage node Npres to which the reference voltage Vref is supplied. The switch circuit SAM and SPRE may further include a sampling switch SAM for controlling the connection between each reference voltage line RVL and the analog-to-digital converter ADC. The sensing reference switch SPRE may be a switch for controlling sensing driving. When it is turned on (or closed), the reference voltage Vref supplied to the reference voltage line RVL by the sensing reference switch SPRE may correspond to the sensing reference voltage VpreS.

The switch circuit for sensing the characteristic value may include a display reference switch RPRE for controlling image driving. The display reference switch RPRE may control the connection between each reference voltage line RVL and the display reference voltage node Nprer to which the reference voltage Vref is supplied. The display reference switch RPRE may be a switch used for display driving. When it is turned on (closed), the reference voltage Vref supplied to the reference voltage line RVL by the display reference switch RPRE may correspond to the display reference voltage VpreR.

In this example, the sensing reference switch SPRE and the display reference switch RPRE may be separately provided or may be integrated into one. The sensing reference voltage VpreS and the display reference voltage VpreR may have the same voltage value or different voltage values.

In the compensation circuit of the display device 100 according to example embodiments of the present disclosure, the timing controller 140 may include a memory system MEM and a compensator COMP. The memory system MEM may store the sensing value output from the analog-to-digital converter ADC or may store the reference sensing value in advance. The compensator COMP may compare the sensing value and the reference sensing value stored in the memory system MEM to produce compensation data for compensating for the characteristic value deviation. In this case, the compensation data produced by the compensator COMP may be stored in the memory system MEM.

The memory system MEM may store the compensation data produced by, e.g., an optical compensation method on all the subpixels SP of the display panel 110 before the display device 100 is shipped. Alternatively, after the display device 100 is shipped, the produced compensation data may be updated and stored based on the characteristic value sensed during display driving.

The compensator COMP may compensate for the image data DATA in a digital signal form using the compensation data stored in the memory system MEM and may output the compensated image data DATA_comp to the data driving circuit 130. Accordingly, the data driving circuit 130 may convert the compensated image data DATA_comp into a data voltage Vdata in an analog signal form through the digital-to-analog converter DAC. The converted data voltage Vdata may be output to the corresponding data line DL through an output buffer BUF. As a result, the characteristic value deviation of the driving transistor DRT in the subpixel SP may be compensated for.

The data driving circuit 130 may include a data voltage output circuit 132 including a latch circuit (not shown), a digital-to-analog converter DAC, and an output buffer BUF. In some examples, the data driving circuit 130 may further include an analog-to-digital converter ADC and various switches SAM, SPRE, and RPRE. Alternatively, the analog-to-digital converter ADC and various switches SAM, SPRE, and RPRE may be provided outside the data driving circuit 130.

The compensator COMP may be provided inside or outside the timing controller 140. The memory system MEM may be provided outside the timing controller 140 or may be implemented in the form of a register inside the timing controller 140.

In some examples, the period for sensing the characteristic value of the driving transistor DRT may be performed after the power-on signal is generated and before display driving starts. Such sensing process is referred to as an on-sensing process. Alternatively, the period for sensing the characteristic value of the driving transistor DRT may proceed after a power off signal is generated. Such sensing process is referred to as an off-sensing process.

Alternatively, the characteristic value sensing period for the driving transistor DRT may be performed in real time while the display is driven. This sensing process is referred to as a real-time (RT) sensing process. In the real-time sensing process, the sensing process may be performed on one or more subpixels SP in one or more subpixel SP lines, in each blank period during the display driving period.

Since in the threshold voltage sensing process of the driving transistor DRT, saturation of the second node N2 voltage may take a long time, it may be performed as an off-sensing process that may proceed for a somewhat long period of time. In contrast, since the mobility sensing process of the driving transistor DRT takes a relatively short time as compared to the threshold voltage sensing process, it may be performed as a real-time sensing process that may proceed for a short period of time.

Figure 5:
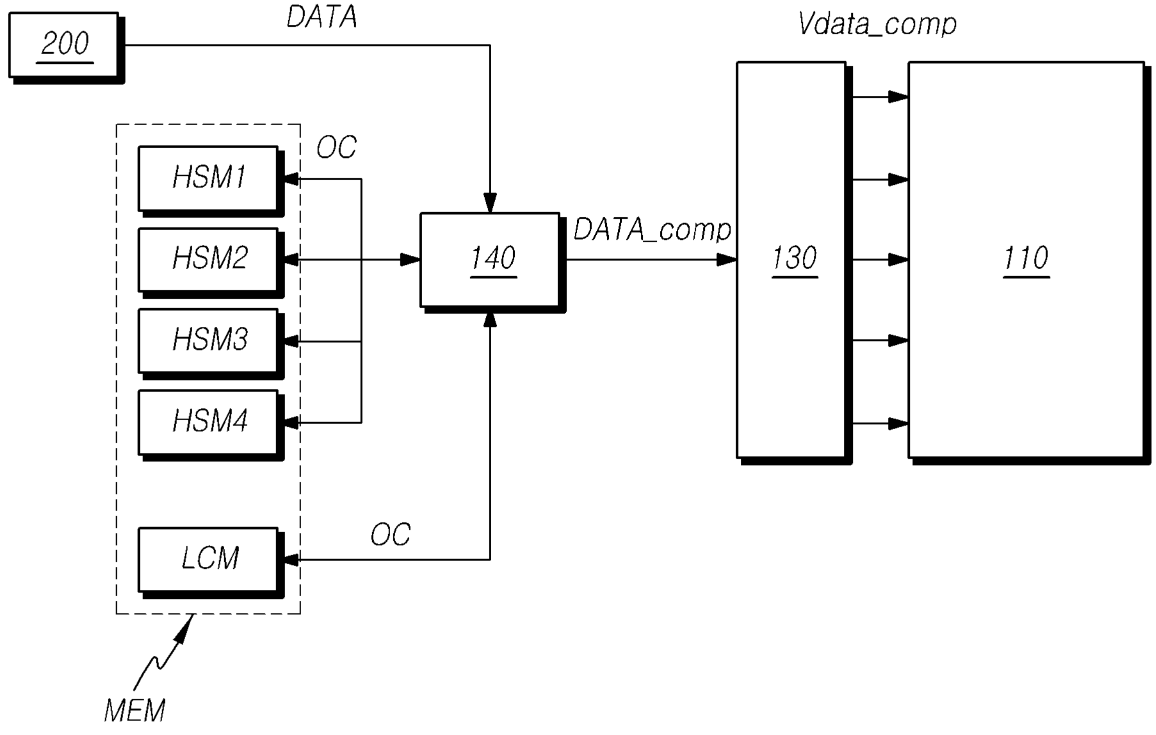
FIG.5 RELATED ART
FIG. 5 is a block diagram illustrating an example of compensating for image data using compensation data stored in a memory in a related art display device.
Figure 6:
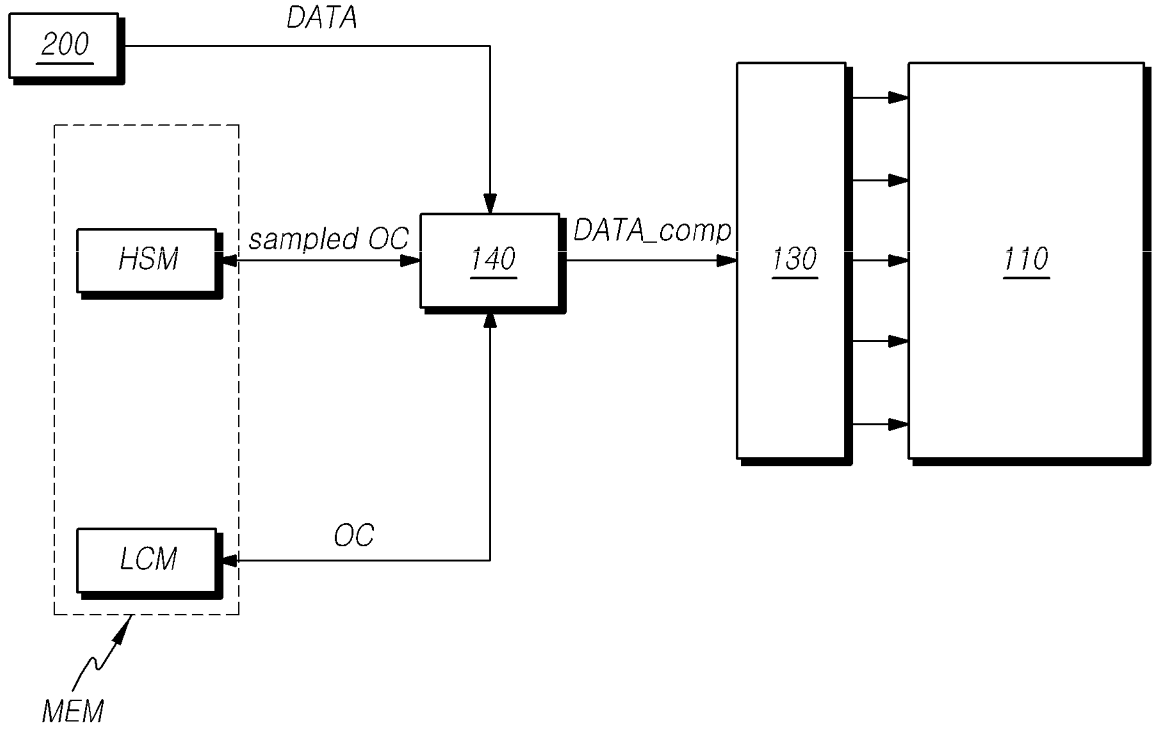
FIG. 6 is a block diagram illustrating an example of generating image data by sampling compensation data stored in a memory in a display device according to example embodiments of the present disclosure.

FIG. 5 is a block diagram illustrating an example of compensating for image data using compensation data stored in a memory in a related art display device. FIG. 6 is a block diagram illustrating an example of generating image data by sampling compensation data stored in a memory in a display device according to example embodiments of the present disclosure.

As shown in FIGS. 5 and 6, a display device 100 may include a memory system MEM for storing initial compensation data OC produced prior to shipment or during display driving, a timing controller 140 for compensating for the image data DATA received from a host system 200 using the initial compensation data OC, and a data driving circuit 130 for converting the compensated image data DATA_comp into a data voltage Vdata and supplying it to the display panel 110.

Here, the memory system MEM may include a large-capacity memory LCM to store the initial compensation data OC for all the subpixels SP and a high-speed memory HSM to process the initial compensation data OC at high speeds.

For example, if the display device 100 is a 4K ultra high definition UHD display device with a resolution of 2,160×3,840 and four subpixels SP of white, red, green, and blue, and the compensation data OC for each subpixel SP includes 16 bits of data, the entire compensation data OC has a data size of 2,160×3,840×4×16=66 MB.

In other words, the large-capacity memory LCM must have a memory size of at least 66 MB or more. Accordingly, the large-capacity memory LCM may be formed of a NAND memory capable of storing large amounts of data. However, since the large-capacity memory LCM, such as a NAND memory, has difficulty processing data at high speeds, the high-speed memory HSM capable of processing compensation data OC at high speeds may be used additionally.

For example, the high-speed memory HSM may use a double data rate (DDR) memory capable of high-speed data processing. The high-speed memory HSM is capable of high-speed data processing but has a relatively small data storage capacity.

Thus, the related art display device 100 utilizes a plurality of high-speed memories, e.g., HSM1, HSM2, HSM3, and HSM4, to process a large amount of compensation data OC, as shown in FIG. 5.

As such, if a plurality of high-speed memories HSM1, HSM2, HSM3, and HSM4 are used, memory size and power consumption may increase.

On the other hand, as illustrated in FIG. 6, the display device 100 according to example embodiments of the present disclosure may sample the entire compensation data OC stored in the large-capacity memory LCM at designated intervals and may store the sampled compensation data in one high-speed memory HSM. Thus, the display device 100 according to example embodiments of the present disclosure may perform compensation processing on all the subpixels SP disposed on the display panel 110 using one large-capacity memory LCM and one high-speed memory HSM. Accordingly, the display device 100 according to example embodiments of the present disclosure may reduce memory size and power consumption.

Figure 7:
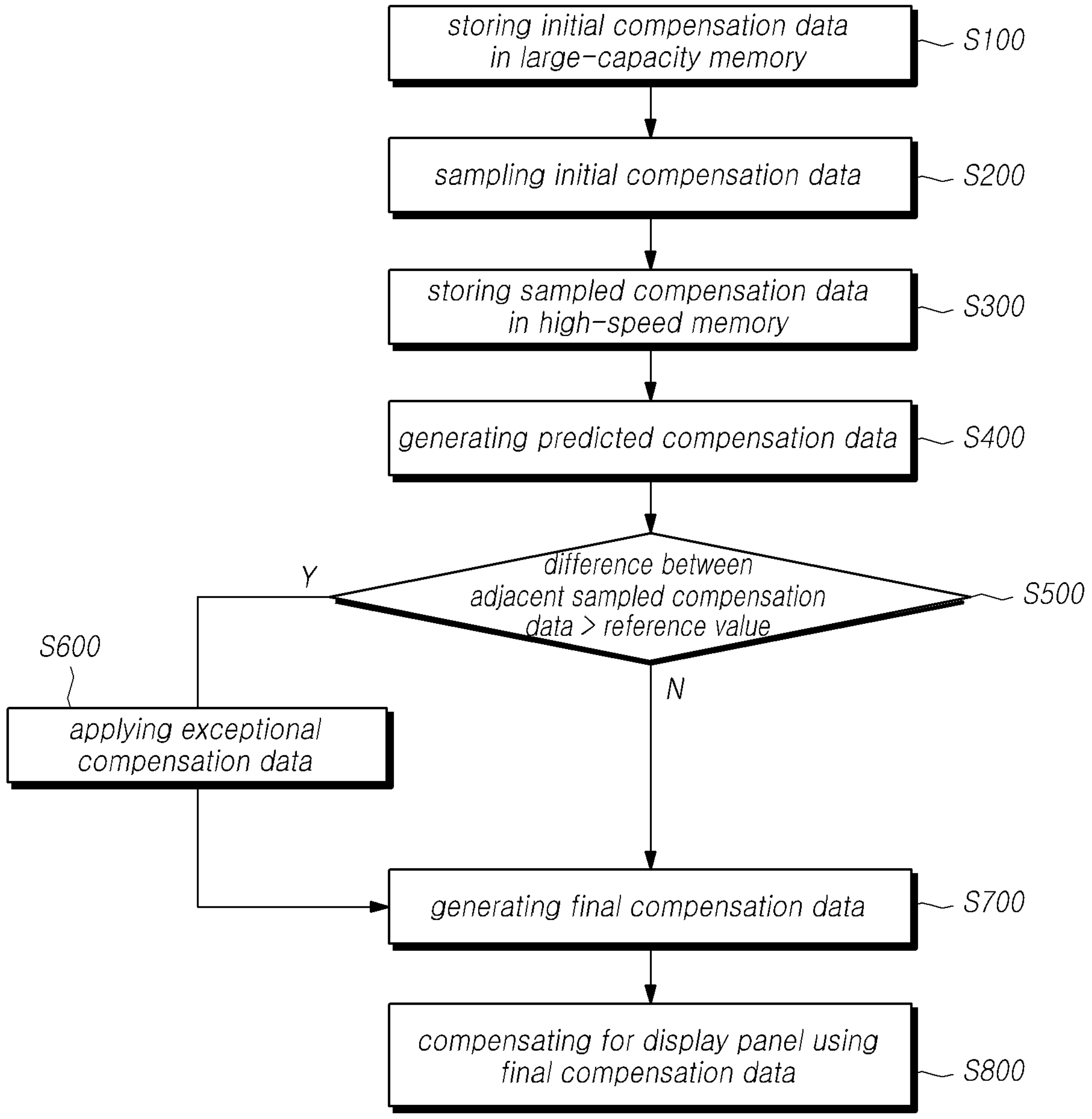
FIG. 7 is a flowchart illustrating a display driving method according to example embodiments of the present disclosure.

FIG. 7 is a flowchart illustrating a display driving method according to example embodiments of the present disclosure.

As shown in FIG. 7, a display driving method according to example embodiments of the present disclosure may include step S100 of storing initial compensation data in a large-capacity memory LCM, step S200 of sampling the initial compensation data, step S300 of storing the sampled compensation data in a high-speed memory HSM, step S400 of generating predicted compensation data, step S500 of comparing a difference between adjacent sampled compensation data with a reference value, step S600 of applying an exception compensation data if the difference between the adjacent sampled compensation data exceeds the reference value, step S700 of generating final compensation data, and step S800 of compensating for a change in a characteristic value of a subpixel SP disposed on the display panel 110 using the final compensation data.

The step S100 of storing the initial compensation data in the large-capacity memory LCM may be a step of storing the initial compensation data generated reflecting the characteristic values for all the subpixels SP disposed on the display panel 110 in the large-capacity memory LCM.

The initial compensation data may be data produced by a method, such as optical compensation, before the display device 100 is shipped. Alternatively, the initial compensation data may be data produced by sensing the characteristic value of the subpixel SP in the process of driving the display device 100. In particular, the initial compensation data may be updated according to the sensing results for the characteristic values of the subpixels SP during display driving.

Figure 8:
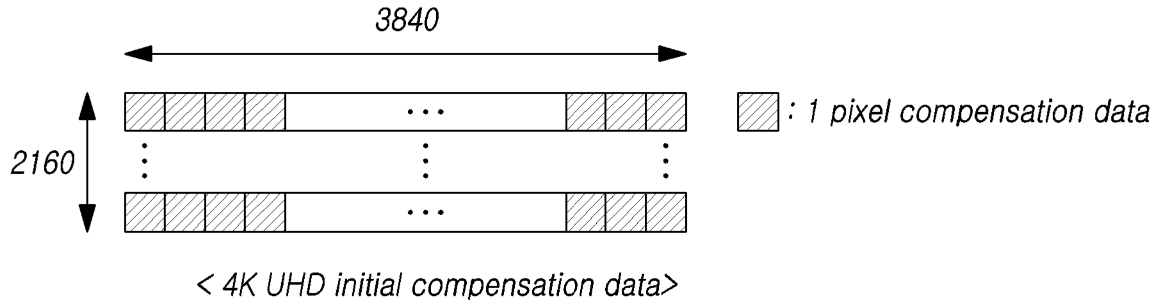
FIG. 8 is a view illustrating an example of initial compensation data stored in a large-capacity memory LCM in a display driving method according to example embodiments of the present disclosure.

FIG. 8 is a view illustrating an example of initial compensation data stored in a large-capacity memory LCM in a display driving method according to example embodiments of the present disclosure.

As illustrated in FIG. 8, the display device 100 according to example embodiments of the present disclosure may have 4K ultra high definition (UHD) with a resolution of 2,160×3,840, where one pixel may include four subpixels SP—white, red, green, and blue.

In this case, if the initial compensation data OC for each subpixel SP is composed of 16 bits, the initial compensation data has a data size of 2,160×3,840×4×16=66 MB.

Accordingly, the large-capacity memory LCM included in the display device 100 according to this example embodiment of the present disclosure preferably has a sufficiently large memory capacity capable of storing compensation data (e.g., at least 66 MB) for all the subpixels SP disposed on the display panel 110.

The step S200 of sampling the initial compensation data may be a step of sampling the initial compensation data for all the subpixels SP disposed on the display panel 110 stored in the large-capacity memory LCM at a designated interval.

For example, if the initial compensation data is sampled in a unit of ½ of the subpixels per frame over two frames (e.g., the odd numbered subpixels in one frame and the even numbered subpixels in the next frame), sampled compensation data corresponding to ½ of the initial compensation data may be generated. Similarly, if the initial compensation data is sampled in a unit of ¼ of the subpixels per frame over four frames (e.g., every fourth subpixel per frame), sampling compensation data corresponding to ¼ of the initial compensation data may be generated.

Figure 9:
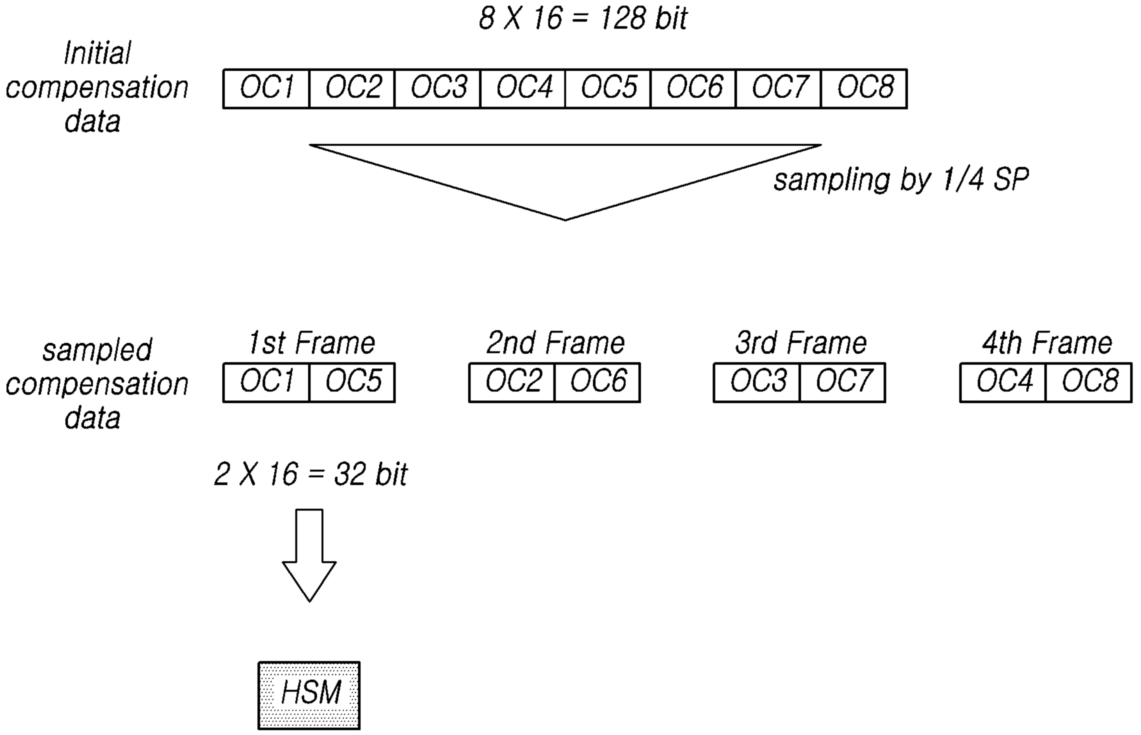
FIG. 9 is a view illustrating an example process of sampling initial compensation data in a unit of ¼ of the subpixels per frame in a display driving method according to example embodiments of the present disclosure.

FIG. 9 is a view illustrating an example process of sampling initial compensation data in a unit of ¼ of the subpixels per frame in a display driving method according to example embodiments of the present disclosure.

As illustrated in FIG. 9, in a display driving method according to example embodiments of the present disclosure, initial compensation data for all the subpixels SP disposed on the display panel 110 may be stored in the large-capacity memory LCM.

Here, eight subpixel compensation data OC1-OC8 for the first subpixel to the eighth subpixel, among the initial compensation data, are shown as an example. If the initial compensation data for one subpixel includes 16 bits, the 8 subpixel compensation data OC1 to OC8 have a size of 128 bits.

In this example, if the 8 subpixel compensation data OC1-OC8 are sampled in a unit of ¼ of the subpixels per frame, the sampled compensation data per frame includes 2 subpixel compensation data.

In this example, the sampling position of the initial compensation data may vary depending on the frame of the image data DATA supplied to the display panel 110.

For example, in the first frame, sampled compensation data comprising the first subpixel compensation data OC1 and the fifth subpixel compensation data OC5 may be generated by sampling the first subpixel compensation data OC1 and the fifth subpixel compensation data OC5. In the second frame, compensation data comprising the second subpixel compensation data OC2 and the sixth subpixel compensation data OC6 may be generated by sampling the second subpixel compensation data OC2 and the sixth subpixel compensation data OC6. In the third frame, compensation data comprising the third subpixel compensation data OC3 and the seventh subpixel compensation data OC7 may be generated by sampling the third subpixel compensation data OC3 and the seventh subpixel compensation data OC7. In the fourth frame, compensation data comprising the fourth subpixel compensation data OC4 and the eighth subpixel compensation data OC8 may be generated by sampling the fourth subpixel compensation data OC4 and the eighth subpixel compensation data OC8.

In this example, the sampled compensation data for each frame includes 2 subpixel compensation data and thus has a size of 2×16 bits=32 bits.

As such, if the initial compensation data OC1 to OC8 are sampled in a unit of ¼ of the subpixels, sampled compensation data corresponding to ¼ of the size of the initial compensation data may be generated. For example, in example the 4K ultra high definition (UHD) display panel 110, if the initial compensation data has a data size of 2,160×3,840×4×16=66 MB, the sampled compensation data per frame is reduced to a size of 66/4 MB=16.5 MB.

Shown here is an example of generating sampled compensation data by sampling the initial compensation data OC at equal intervals (e.g., every other subpixel or every fourth subpixel per frame), but the sampling period may be varied, and sampling may be performed only on a specific portion of the initial compensation data OC.

The step S300 of storing the sampled compensation data in the high-speed memory HSM may be a step of storing the sampled compensation data generated through the sampling process in one high-speed memory HSM capable of high-speed processing. In this case, since the high-speed memory HSM is for storing the sampled compensation data, it may be selected to have a sufficient size capable of storing the sampled compensation data.

For example, in the example 4K ultra high definition (UHD) display panel 110, if the initial compensation data has a size of 2,160×3,840×4×16=66 MB, the sampled compensation data may have a size of 66/4 MB=16.5 MB. Thus, the high-speed memory HSM may be selected to have a size capable of storing 16.5 MB of sampled compensation data.

The step S400 of generating predicted compensation data may be a step of predicting and generating compensation data positioned in the interval between compensation data sampled in a unit of 1/N of the subpixels per frame, where N is an integer greater than or equal to 2.

Figure 10:
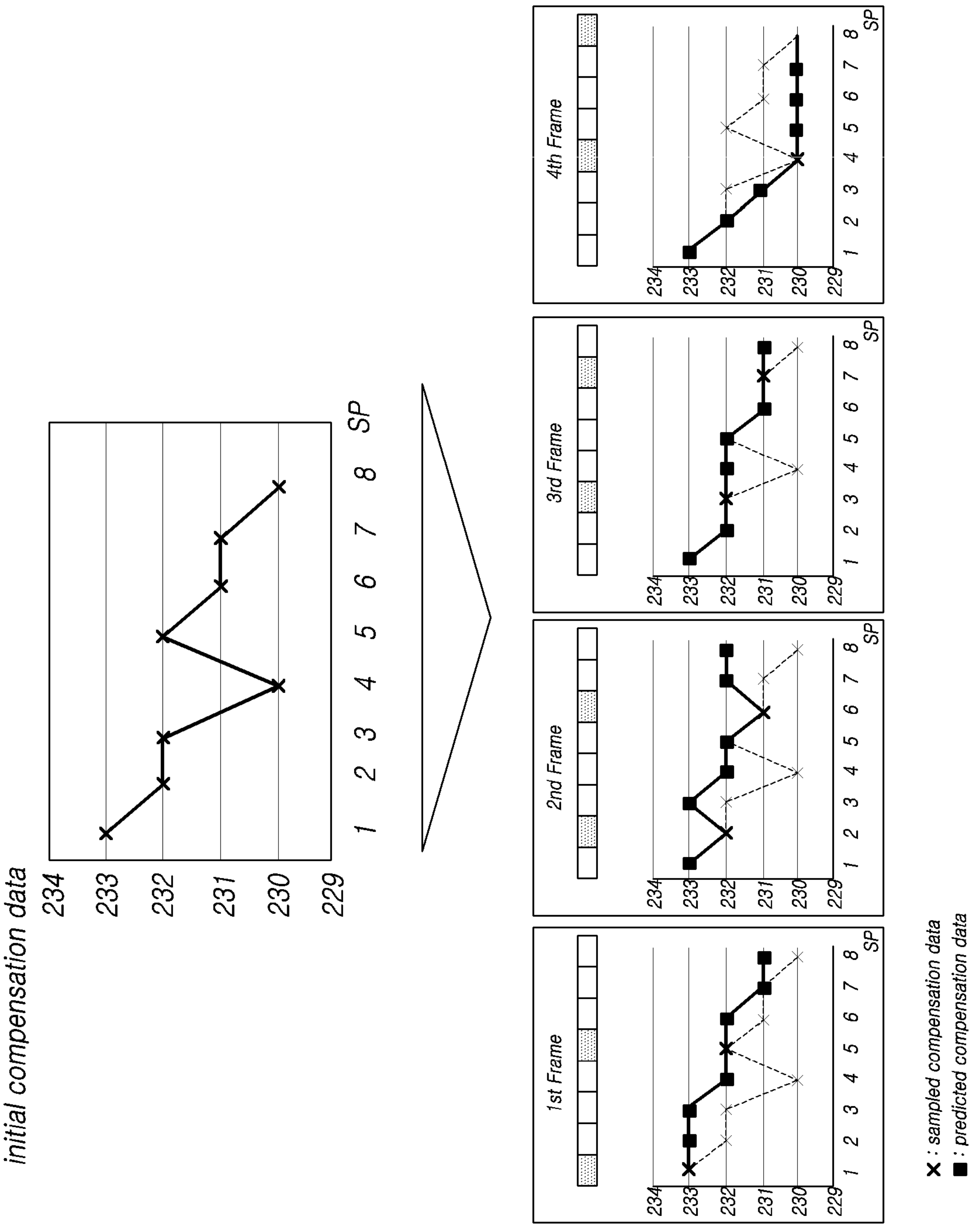
FIG. 10 is a view illustrating an example process of generating predicted compensation data in a display driving method according to example embodiments of the present disclosure.
Figure 11:
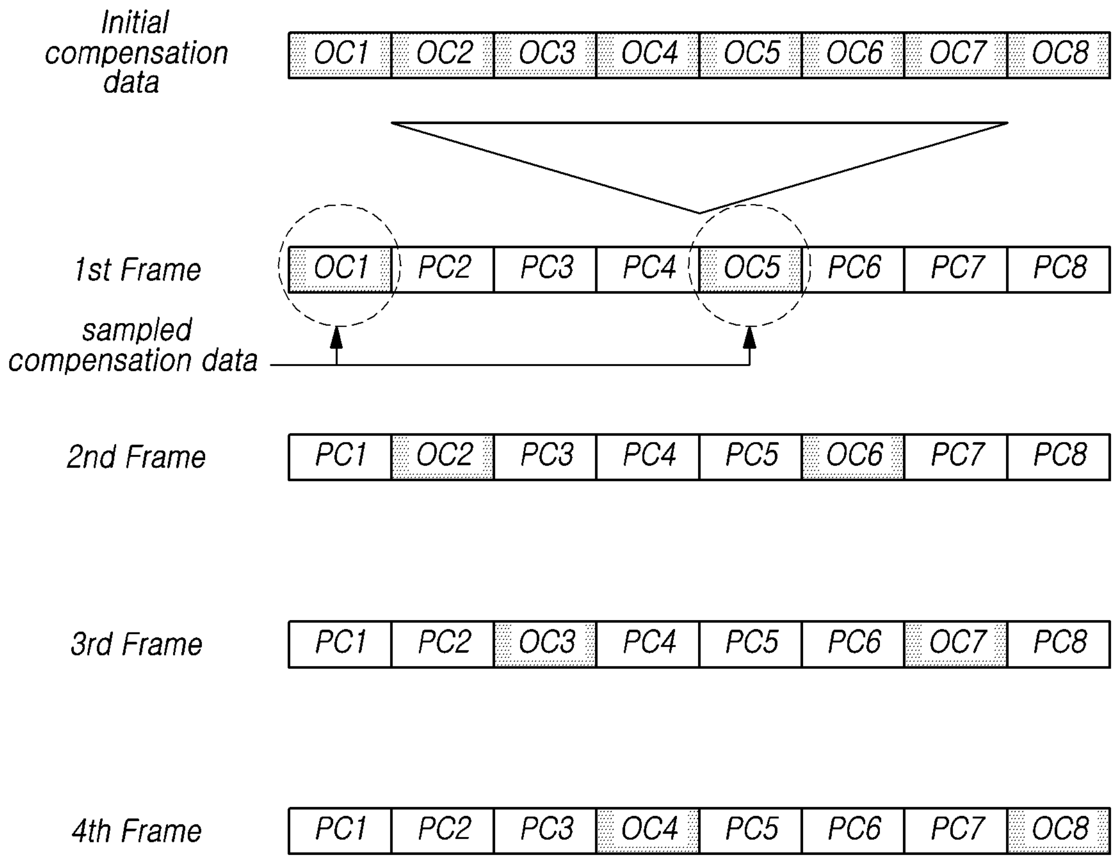
FIG. 11 is a view illustrating an example of predicted compensation data in a display driving method according to example embodiments of the disclosure.

FIG. 10 is a view illustrating an example process of generating predicted compensation data in a display driving method according to example embodiments of the present disclosure. FIG. 11 is a view illustrating an example of predicted compensation data.

As shown in FIGS. 10 and 11, the display driving method according to example embodiments of the present disclosure may add predicted compensation data in the interval between sampled compensation data sampled in a unit of 1/N of the subpixels per frame (where N is a natural number equal to or larger than 2). In other words, predicted compensation data may be added for the other (N−1)/N of the subpixels per frame (i.e., the subpixels for which compensation data is not sampled in the given frame).

For example, if 8 subpixel compensation data OC1-OC8 are sampled in a unit of ¼ of the subpixels for each frame, the sampled compensation data includes 2 subpixel compensation data in each frame.

When the first subpixel compensation data OC1 and the fifth subpixel compensation data OC5 among the eight subpixel compensation data OC1-OC8 are sampled in the first frame, predicted compensation data may be generated and added for the second subpixel to the fourth subpixel and the sixth subpixel to the eighth subpixel.

Here, since the operation of generating the predicted compensation data may be performed by the timing controller 140, there is no need to increase the capacity of the high-speed memory HSM.

Since the subpixels to which predicted compensation data is to be applied are positioned between subpixels to which sampled compensation data is applied, the predicted compensation data may be generated by interpolation.

For example, when the first subpixel compensation data OC1 and the fifth subpixel compensation data OC5 are sampled in the first frame, the predicted compensation data PC2-PC4 corresponding to the second subpixel to the fourth subpixel may be selected as an integer positioned between the first subpixel compensation data OC1 and the fifth subpixel compensation data OC5.

If the first subpixel compensation data OC1 sampled in the first frame has a value of 233 and the fifth subpixel compensation data OC5 has a value of 232, the predicted compensation data PC2-PC4 corresponding to the second subpixel to the fourth subpixel may have a value of 232 or 233.

Further, when the second subpixel compensation data OC2 and the sixth subpixel compensation data OC6 are sampled in the second frame, an integer positioned between the second subpixel compensation data OC2 and the sixth subpixel compensation data OC6 may be selected as the predicted compensation data PC3-PC5 corresponding to the third to the fifth subpixels.

Further, when the third subpixel compensation data OC3 and the seventh subpixel compensation data OC7 are sampled in the third frame, an integer positioned between the third subpixel compensation data OC3 and the seventh subpixel compensation data OC7 may be selected as the predicted compensation data PC4-PC6 corresponding to the fourth subpixel to the sixth subpixel.

Similarly, when the fourth subpixel compensation data OC4 and the eighth subpixel compensation data OC8 are sampled in the fourth frame, an integer positioned between the fourth subpixel compensation data OC4 and the eighth subpixel compensation data OC8 may be selected as the predicted compensation data PC5-PC7 corresponding to the fifth to the seventh subpixels.

Figure 12:
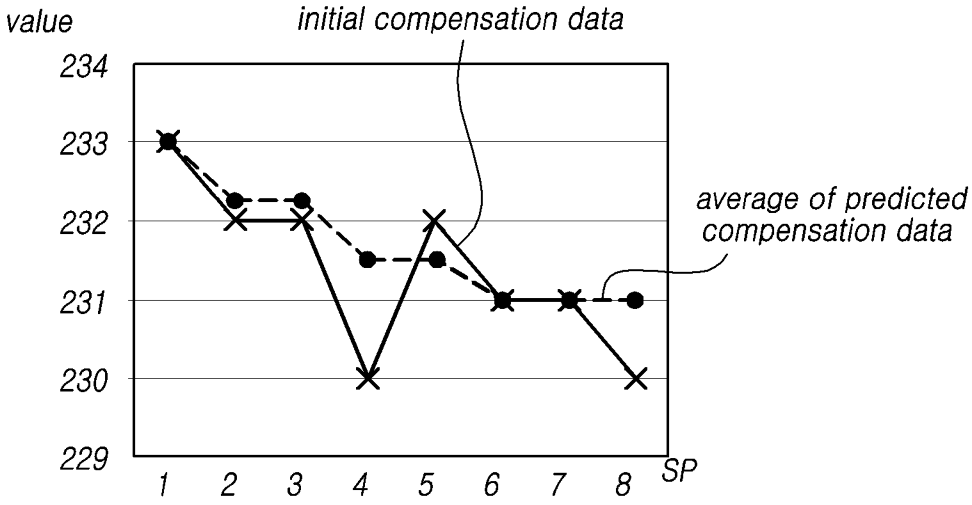
FIG. 12 is a view illustrating a result of mitigation of a compensation error by predicted compensation data in a display driving method according to example embodiments of the present disclosure.

FIG. 12 is a view illustrating a result of mitigation of a compensation error by predicted compensation data in a display driving method according to example embodiments of the disclosure.

As illustrated in FIG. 12, since the display driving method according to example embodiments of the present disclosure may extract sampled compensation data in different positions according to the frame and may add predicted compensation data in the interval between sampled compensation data, averaging the predicted compensation data may reduce a deviation existing in the initial compensation data between the adjacent subpixels.

In other words, since the deviation in the predicted compensation data between the adjacent subpixels in example embodiments of the present disclosure may be more reduced than the deviation in the initial compensation data among the adjacent subpixels, a potential compensation error due to such deviation in the initial compensation data may be mitigated.

Here, an example of generating predicted compensation data by using an interpolation method between sampled compensation data has been described, but predicted compensation data may be generated in various other ways.

Relatedly, if characteristic values between adjacent subpixels whose compensation data are sampled (e.g., the first and the fifth subpixels in FIG. 9) vary greatly, a deviation between predicted compensation data generated by interpolation and initial compensation data for a subpixel between those adjacent subpixels may increase, thus resulting in poor compensation.

Therefore, it is preferable not to apply predicted compensation data if a difference between the characteristic values of such adjacent subpixels exceeds a certain range.

The step S500 of comparing the difference between adjacent sampled compensation data with the reference value may be a step of comparing the difference between adjacent sampled compensation data with the reference value to reduce a potential compensation error.

The step S600 of applying the exception compensation data if the difference between adjacent sampled compensation data exceeds the reference value may be a step of applying the exception compensation data, not the predicted compensation data, to the interval between the adjacent sampled compensation data.

Figure 13:
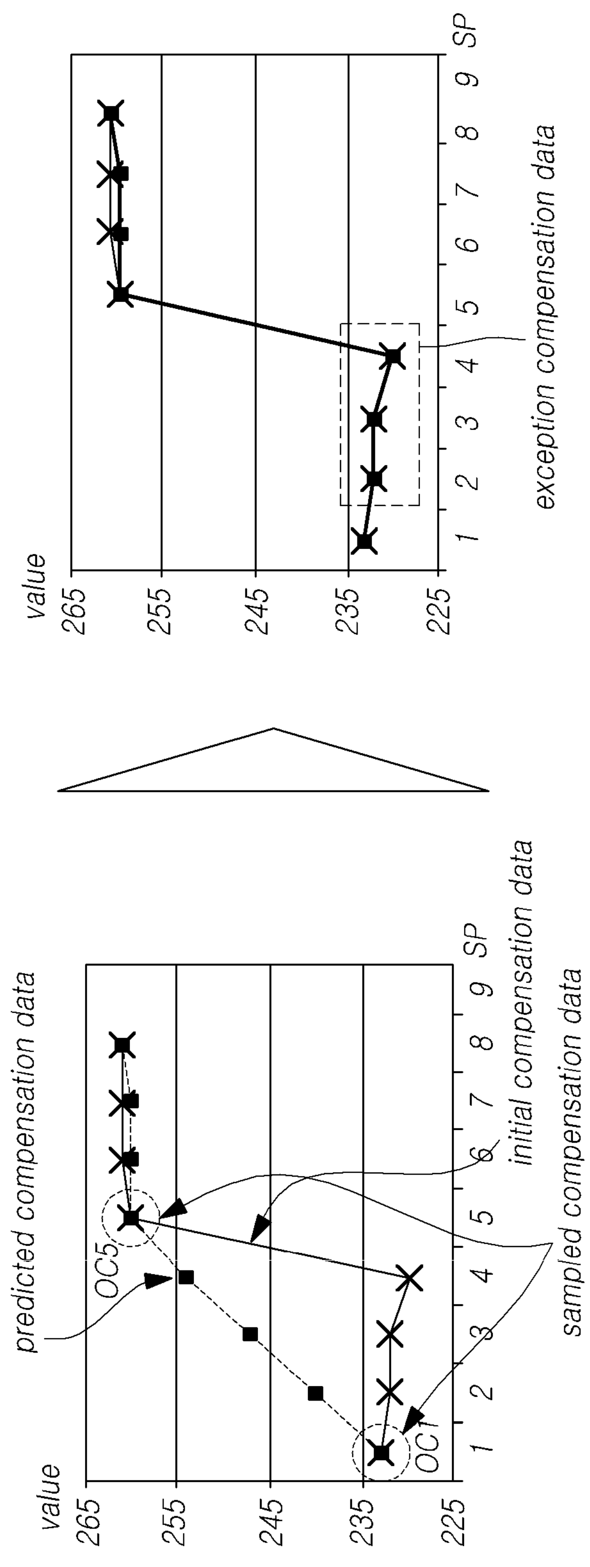
FIG. 13 is a view illustrating an example process of applying an exception compensation data in a display driving method according to example embodiments of the present disclosure.

FIG. 13 is a view illustrating an example process of applying an exception compensation data in a display driving method according to example embodiments of the present disclosure.

As illustrated in FIG. 13, the display driving method according to example embodiments of the present disclosure may apply the exception compensation data, not the predicted compensation data, to the interval between the adjacent sampled compensation data if the difference between the adjacent sampled compensation data exceeds the reference value.

For example, when the first subpixel compensation data OC1 and the fifth subpixel compensation data OC5 are sampled in the first frame, an integer between the first subpixel compensation data OC1 and the fifth subpixel compensation data OC5 may be selected respectively as the predicted compensation data PC2-PC4 corresponding to the second subpixel to the fourth subpixel.

If the first subpixel compensation data OC1 sampled in the first frame has a value of 233 and the fifth subpixel compensation data OC5 has a value of 260, the predicted compensation data PC2-PC4 corresponding to the second subpixel to the fourth subpixel may have values of 240, 248, and 254, respectively.

However, if the difference between the first subpixel compensation data OC1 and the fifth subpixel compensation data OC5 sampled in the first frame has a relatively large value, such as 27 here, it may represent an abrupt change in characteristic value in the interval between the first subpixel compensation data OC1 and the fifth subpixel compensation data OC5.

As such, if the difference between adjacent sampled compensation data (here, OC1 and OC5) exceeds the reference value, it may be determined that there is an abrupt change in the subpixel characteristic value between the first subpixel and the fifth subpixel, and the exception compensation data, rather than the predicted compensation data by interpolation, may be applied to the second to the fourth subpixels.

In this example, the initial compensation data may be used as the exception compensation data to reflect the abrupt change in the subpixel characteristic value.

For example, if the difference between the first subpixel compensation data OC1 and the fifth subpixel compensation data OC5 sampled in the first frame exceeds the reference value, the initial compensation data OC2-OC4 corresponding to the second subpixel to the fourth subpixel may be used as the exception compensation data, without generating the predicted compensation data PC2-PC4 for the second subpixel to the fourth subpixel.

The step S700 of generating the final compensation data may be a step of generating the final compensation data using the sampled compensation data, as well as the predicted compensation data or the exception compensation data.

If the difference between adjacent sampled compensation data in any frame is less than or equal to the reference value, the final compensation data may be generated based on the sampled compensation data and the predicted compensation data generated to apply between the sampled compensation data.

In contrast, if the difference between at least some adjacent sampled compensation data in a specific frame exceeds the reference value, the final compensation data may be generated by applying the initial compensation data between the corresponding adjacent sampled compensation data.

Figure 14:
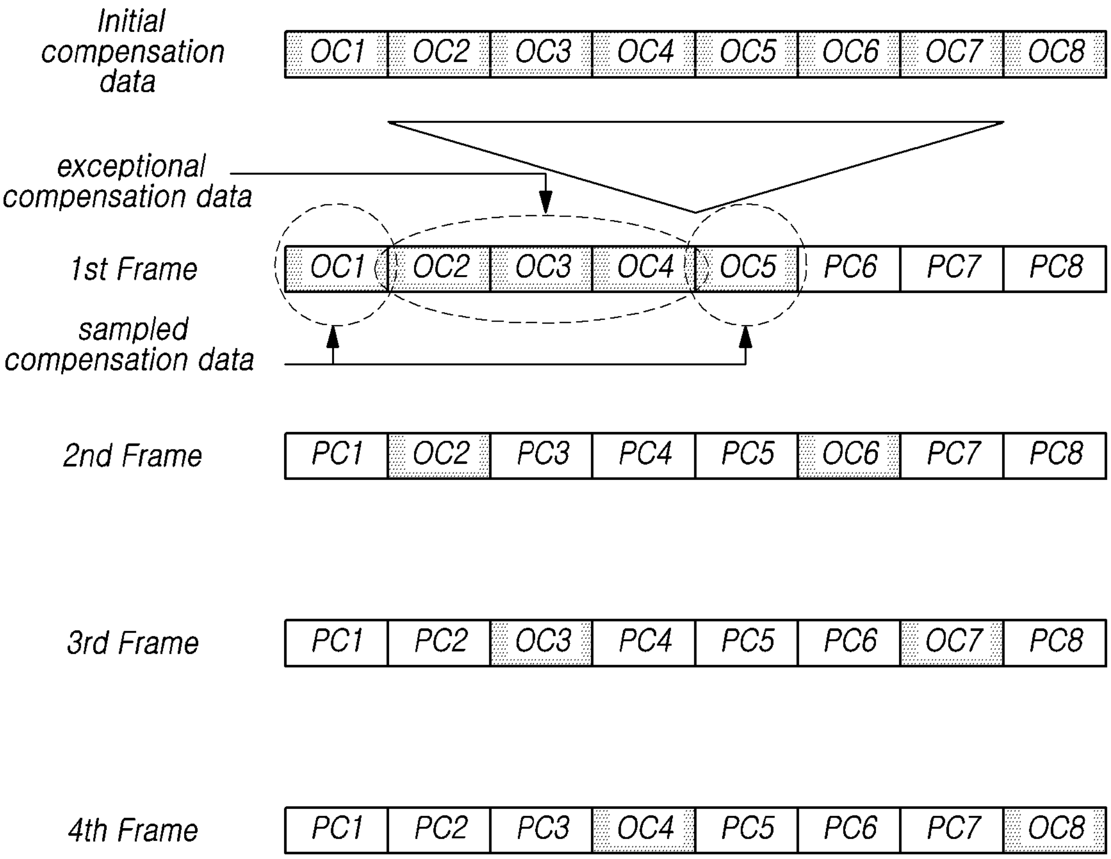
FIG. 14 is a view illustrating an example of generating final compensation data by applying an exception compensation data to a specific frame in a display driving method according to example embodiments of the present disclosure.

FIG. 14 is a view illustrating an example of generating final compensation data by applying an exception compensation data to a specific frame in a display driving method according to example embodiments of the present disclosure.

As illustrated in FIG. 14, the display driving method according to example embodiments of the present disclosure may apply the exception compensation data, not the predicted compensation data, to the interval between adjacent sampled compensation data to generate the final compensation data if the difference between the adjacent sampled compensation data exceeds the reference value.

For example, if the difference between the first subpixel compensation data OC1 and the fifth subpixel compensation data OC5 sampled in the first frame exceeds the reference value, the final compensation data may be generated for the first frame by using the initial compensation data OC2-OC4 corresponding to the second subpixel to the fourth subpixel as the exception compensation data, without generating the predicted compensation data PC2-PC4 for the second subpixel to the fourth subpixel.

As such, if the difference between adjacent sampled compensation data exceeds the reference value, a potential compensation error may be mitigated by applying the initial compensation data to the interval between the adjacent sampled compensation data in the first frame.

In contrast, for example, if the difference between the second subpixel compensation data OC2 and the sixth subpixel compensation data OC6 sampled in the second frame, the difference between the third subpixel compensation data OC3 and the seventh subpixel compensation data OC7 sampled in the third frame, and the difference between the fourth subpixel compensation data OC4 and the eighth subpixel compensation data OC8 sampled in the fourth frame are each less than or equal to the reference value, the final compensation data may be generated in the second to the fourth frame by applying the predicted compensation data, e.g., generated by interpolation, to the interval between the adjacent sampled compensation data.

The step S800 of compensating for a characteristic value of a subpixel disposed on the display panel 110 using the final compensation data may be a step of compensating for image data by applying the final compensation data to the image data and converting the compensated image data into a data voltage to operate the display panel.

Example embodiments of the present disclosure may be described as follows.

A display device according to an example embodiment may include: a display panel including a plurality of gate lines, a plurality of data lines, and a plurality of subpixels respectively connected to the plurality of gate lines and the plurality of data lines; a gate driving circuit configured to supply a scan signal to the plurality of gate lines; a data driving circuit configured to convert a compensated digital image data into an analog data voltage and to supply the analog data voltage to the plurality of data lines; a large-capacity memory configured to store initial compensation data based on a characteristic value for each of the plurality of subpixels; a high-speed memory configured to store sampled compensation data sampled from the initial compensation data for less than all of the plurality of subpixels in one frame; and a timing controller configured to control the gate driving circuit and the data driving circuit, to determine final compensation data based on at least one of the sampled compensation data and the initial compensation data, and to output the compensated digital image data based on an input image data and the final compensation data.

In some example embodiments, the characteristic value for a subpixel among the plurality of subpixels may reflect a threshold voltage or mobility of a driving transistor disposed in the subpixel.

In some example embodiments, the initial compensation data may be generated in advance through an optical compensation method before shipment of the display device or may be based on the characteristic value sensed while the display panel is driven.

In some example embodiments, the sampled compensation data may be for a group of subpixels among the plurality of subpixels in the one frame and may be for a different group of subpixels among the plurality of subpixels in another frame following the one frame.

In some example embodiments, the large-capacity memory may be a NAND memory having a capacity larger than or equal to a size of the initial compensation data, and the high-speed memory may be a double data rate (DDR) memory having a capacity smaller than the capacity of the large-capacity memory and larger than or equal to a size of the sampled compensation data in the one frame.

In some example embodiments, the timing controller may be further configured to determine a predicted compensation data for at least one subpixel disposed between adjacent subpixels, among the plurality of subpixels, for which the sampled compensation data is sampled from the initial compensation data in the one frame, and the sampled compensation data for the adjacent subpixels may be stored in the high-speed memory as adjacent sampled compensation data.

In some example embodiments, the timing controller may be further configured to determine the predicted compensation data for the at least one subpixel based on interpolation of the adjacent sampled compensation data.

In some example embodiments, the timing controller may be further configured to: determine whether a difference between the adjacent sampled compensation data exceeds a reference value; and if the difference between the adjacent sampled compensation data exceeds the reference value, determine an exception compensation data for the at least one subpixel based on the initial compensation data for the at least one subpixel and apply the exception compensation data as the final compensation data to the at least one subpixel.

In some example embodiments, the timing controller may be further configured to: sample the initial compensation data for an (n+1)-th subpixel among the plurality of subpixels and store the sampled compensation data for the (n+1)-th subpixel in the high-speed memory in an (n+1)-th frame; and sample the initial compensation data for an (n+2)-th subpixel among the plurality of subpixels and store the sampled compensation data for the (n+2)-th subpixel in the high-speed memory in an (n+2)-th frame, wherein n may be an integer greater than or equal to 0.

A method of driving a display device having a plurality of subpixels according to an example embodiment may include: storing initial compensation data for each of the plurality of subpixels in a large-capacity memory; sampling the initial compensation data for less than all of the plurality of subpixels in one frame; storing the sampled compensation data for less than all of the plurality of subpixels in a high-speed memory in the one frame; determining final compensation data for the plurality of subpixels based on at least one of the initial compensation data and the sampled compensation data; and compensating for a change in a characteristic value of the plurality of subpixels based on the final compensation data.

In some example embodiments, the method may further include driving the plurality of subpixels based on an input image data and the final compensation data.

In some example embodiments, the initial compensation data may be generated in advance through an optical compensation method before shipment of the display device or through sensing a data reflecting the characteristic value while the display panel is driven.

In some example embodiments, the sampling of the initial compensation data may include: sampling the initial compensation data for a first set of subpixels among the plurality of subpixels in the one frame; and sampling the initial compensation data for a second set of subpixels different from the first set among the plurality of subpixels in another frame following the one frame.

In some example embodiments, the method may further include determining a predicted compensation data for at least one subpixel disposed between adjacent subpixels, among the plurality of subpixels, for which the initial compensation data is sampled in the one frame, the sampled compensation data for the adjacent subpixels being stored in the high-speed memory as adjacent sampled compensation data. The determining of the final compensation data may include determining the final compensation data for the plurality of subpixels based on at least one of the initial compensation data, the sampled compensation data, and the predicted compensation data.

In some example embodiments, the determining of the predicted compensation data may include determining the predicted compensation data for the at least one subpixel based on interpolation of the adjacent sampled compensation data.

In some example embodiments, the method may further include: comparing a difference between the adjacent sampled compensation data with a reference value; and if the difference between the adjacent sampled compensation data exceeds the reference value, determining an exception compensation data for the at least one subpixel based on the initial compensation data for the at least one subpixel. The determining of the final compensation data may include determining the exception compensation data as the final compensation data for the at least one subpixel.

In some example embodiments, the sampling of the initial compensation data may include: sampling the initial compensation data for an (n+1)-th subpixel among the plurality of subpixels in an (n+1)-th frame; and sampling the initial compensation data for an (n+2)-th subpixel among the plurality of subpixels in an (n+2)-th frame. The storing of the sampled compensation data may include: storing the sampled compensation data for the (n+1)-th subpixel in the high-speed memory in the (n+1)-th frame; and storing the sampled compensation data for the (n+2)-th subpixel in the high-speed memory in the (n+2)-th frame, wherein n is an integer greater than or equal to 0.

A display device according to an example embodiment may include: a display panel including a plurality of data lines and a plurality of subpixels respectively connected to the plurality of data lines; a data driving circuit configured to apply a data voltage to the plurality of data lines based on a compensated image data; a large-capacity memory configured to store initial compensation data based on a characteristic value for each of the plurality of subpixels; a high-speed memory configured to store sampled compensation data; and a timing controller configured to control the data driving circuit, to determine the final compensation data based on at least one of the sampled compensation data and the initial compensation data, and to output the compensated image data based on an input image data and the final compensation data. The timing controller may be further configured to: sample the initial compensation data for an (n+1)-th subpixel among the plurality of subpixels and store the sampled compensation data for the (n+1)-th subpixel in the high-speed memory in an (n+1)-th frame; and sample the initial compensation data for an (n+2)-th subpixel among the plurality of subpixels and store the sampled compensation data for the (n+2)-th subpixel in the high-speed memory in an (n+2)-th frame, wherein n may be an integer greater than or equal to 0.

In some example embodiments, the high-speed memory may be configured to store the sampled compensation data sampled from the initial compensation data for less than all of the plurality of subpixels in one frame.

In some example embodiments, the timing controller may be further configured to output only the sampled compensation data for the (n+1)-th subpixel in the high-speed memory during the (n+1)-th frame.

Various modifications, additions, and substitutions to the described embodiments will be readily apparent to those skilled in the art, and the general principles defined herein may be applied to other embodiments and applications without departing from the spirit or scope of the present disclosure. The above description and the accompanying drawings provide examples of the technical idea of the disclosure for illustrative purposes only. That is, the disclosed embodiments are not intended to limit the scope of the principle or technical idea of the present disclosure. Therefore, the foregoing example embodiments should not be construed as being exhaustive in any aspects.

It will be apparent to those skilled in the art that various modifications and variations can be made in the present disclosure without departing from the spirit or scope of the disclosure. Thus, it is intended that the present disclosure cover such modifications and variations of this disclosure.

What is claimed:

1. A display device, comprising:

a display panel including a plurality of gate lines, a plurality of data lines, and a plurality of subpixels respectively connected to the plurality of gate lines and the plurality of data lines;

a gate driving circuit configured to supply a scan signal to the plurality of gate lines;

a data driving circuit configured to convert a compensated digital image data into an analog data voltage and to supply the analog data voltage to the plurality of data lines;

a large-capacity memory configured to store initial compensation data based on a characteristic value for each of the plurality of subpixels;

a high-speed memory configured to store sampled compensation data sampled from the initial compensation data for less than all of the plurality of subpixels in one frame; and a timing controller configured to:

control the gate driving circuit and the data driving circuit, determine final compensation data based on at least one of the sampled compensation data and the initial compensation data, and output the compensated digital image data based on an input image data and the final compensation data.

2. The display device of claim 1, wherein the characteristic value for a subpixel among the plurality of subpixels reflects a threshold voltage or mobility of a driving transistor disposed in the subpixel.

3. The display device of claim 1, wherein the initial compensation data is generated in advance through an optical compensation method before shipment of the display device or is based on the characteristic value sensed while the display panel is driven.

4. The display device of claim 1, wherein the sampled compensation data is for a group of subpixels among the plurality of subpixels in the one frame and is for a different group of subpixels among the plurality of subpixels in another frame following the one frame.

5. The display device of claim 1, wherein:

the large-capacity memory is a NAND memory having a capacity larger than or equal to a size of the initial compensation data, and the high-speed memory is a double data rate (DDR) memory having a capacity smaller than the capacity of the large-capacity memory and larger than or equal to a size of the sampled compensation data in the one frame.

6. The display device of claim 1, wherein:

the timing controller is further configured to determine a predicted compensation data for at least one subpixel disposed between adjacent subpixels, among the plurality of subpixels, for which the sampled compensation data is sampled from the initial compensation data in the one frame, and the sampled compensation data for the adjacent subpixels is stored in the high-speed memory as adjacent sampled compensation data.

7. The display device of claim 6, wherein the timing controller is further configured to determine the predicted compensation data for the at least one subpixel based on interpolation of the adjacent sampled compensation data.

8. The display device of claim 6, wherein the timing controller is further configured to:

determine whether a difference between the adjacent sampled compensation data exceeds a reference value; and if the difference between the adjacent sampled compensation data exceeds the reference value, determine an exception compensation data for the at least one subpixel based on the initial compensation data for the at least one subpixel and apply the exception compensation data as the final compensation data to the at least one subpixel.

9. The display device of claim 1, wherein the timing controller is further configured to:

sample the initial compensation data for an (n+1)-th subpixel among the plurality of subpixels and store the sampled compensation data for the (n+1)-th subpixel in the high-speed memory in an (n+1)-th frame; and sample the initial compensation data for an (n+2)-th subpixel among the plurality of subpixels and store the sampled compensation data for the (n+2)-th subpixel in the high-speed memory in an (n+2)-th frame, and wherein n is an integer greater than or equal to 0.

10. A method of driving a display device having a plurality of subpixels, the method comprising:

storing initial compensation data for each of the plurality of subpixels in a large-capacity memory;

sampling the initial compensation data for less than all of the plurality of subpixels in one frame;

storing the sampled compensation data for less than all of the plurality of subpixels in a high-speed memory in the one frame;

determining final compensation data for the plurality of subpixels based on at least one of the initial compensation data and the sampled compensation data; and compensating for a change in a characteristic value of the plurality of subpixels based on the final compensation data.

11. The method of claim 10, further comprising:

driving the plurality of subpixels based on an input image data and the final compensation data.

12. The method of claim 10, wherein the initial compensation data is generated in advance through an optical compensation method before shipment of the display device or through sensing a data reflecting the characteristic value while the display panel is driven.

13. The method of claim 10, wherein the sampling of the initial compensation data includes:

sampling the initial compensation data for a first set of subpixels among the plurality of subpixels in the one frame; and sampling the initial compensation data for a second set of subpixels different from the first set among the plurality of subpixels in another frame following the one frame.

14. The method of claim 10, further comprising:

determining a predicted compensation data for at least one subpixel disposed between adjacent subpixels, among the plurality of subpixels, for which the initial compensation data is sampled in the one frame, the sampled compensation data for the adjacent subpixels being stored in the high-speed memory as adjacent sampled compensation data, wherein the determining of the final compensation data includes determining the final compensation data for the plurality of subpixels based on at least one of the initial compensation data, the sampled compensation data, and the predicted compensation data.

15. The method of claim 14, wherein the determining of the predicted compensation data includes determining the predicted compensation data for the at least one subpixel based on interpolation of the adjacent sampled compensation data.

16. The method of claim 14, further comprising:

comparing a difference between the adjacent sampled compensation data with a reference value; and if the difference between the adjacent sampled compensation data exceeds the reference value, determining an exception compensation data for the at least one subpixel based on the initial compensation data for the at least one subpixel, wherein the determining of the final compensation data includes determining the exception compensation data as the final compensation data for the at least one subpixel.

17. The method of claim 10, wherein:

the sampling of the initial compensation data includes:

sampling the initial compensation data for an (n+1)-th subpixel among the plurality of subpixels in an (n+1)-th frame; and sampling the initial compensation data for an (n+2)-th subpixel among the plurality of subpixels in an (n+2)-th frame, the storing of the sampled compensation data includes:

storing the sampled compensation data for the (n+1)-th subpixel in the high-speed memory in the (n+1)-th frame; and storing the sampled compensation data for the (n+2)-th subpixel in the high-speed memory in the (n+2)-th frame, and wherein n is an integer greater than or equal to 0.

18. A display device, comprising:

a display panel including a plurality of data lines and a plurality of subpixels respectively connected to the plurality of data lines;

a data driving circuit configured to apply a data voltage to the plurality of data lines based on a compensated image data;

a large-capacity memory configured to store initial compensation data based on a characteristic value for each of the plurality of subpixels;

a high-speed memory configured to store sampled compensation data; and a timing controller configured to control the data driving circuit, to determine the final compensation data based on at least one of the sampled compensation data and the initial compensation data, and to output the compensated image data based on an input image data and the final compensation data, wherein the timing controller is further configured to:

sample the initial compensation data for an (n+1)-th subpixel among the plurality of subpixels and store the sampled compensation data for the (n+1)-th subpixel in the high-speed memory in an (n+1)-th frame; and sample the initial compensation data for an (n+2)-th subpixel among the plurality of subpixels and store the sampled compensation data for the (n+2)-th subpixel in the high-speed memory in an (n+2)-th frame, and wherein n is an integer greater than or equal to 0.

19. The display device of claim 18, wherein the high-speed memory is configured to store the sampled compensation data sampled from the initial compensation data for less than all of the plurality of subpixels in one frame.

20. The display device of claim 19, wherein the timing controller is further configured to output only the sampled compensation data for the (n+1)-th subpixel in the high-speed memory during the (n+1)-th frame.

* * * * *